(12) United States Patent
Wirz

(10) Patent No.: US 6,220,937 B1
(45) Date of Patent: Apr. 24, 2001

(54) DEVICE FOR THE HONING OF GEARS

(75) Inventor: Walter Wirz, Pfäffikon (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/524,009

(22) Filed: Mar. 13, 2000

(30) Foreign Application Priority Data

Apr. 6, 1999 (DE) .............................................. 199 15 351

(51) Int. Cl.$^7$ ...................................................... B24B 1/00
(52) U.S. Cl. .................................................. 451/47; 451/56
(58) Field of Search .................................. 451/47, 48, 56, 451/177, 178, 179, 443, 541, 547, 342, 219

(56) References Cited

U.S. PATENT DOCUMENTS 4,354,328  10/1982  Ainoura .

FOREIGN PATENT DOCUMENTS

| 1127176 | 4/1962 | (DE) . |
| 1202097 | 9/1965 | (DE) . |
| 197 24 527 | 12/1998 | (DE) . |

*Primary Examiner*—Derris H. Banks
(74) *Attorney, Agent, or Firm*—Browdy And Neimark

(57) ABSTRACT

The device has a holder (10) in which an arbor (11) is located displaceably in direction z'. The arbor (11) is centralized by springs (15) and damped by damping elements (16). Located on the arbor (11) is a sleeve (18), displaceable in the x-direction at right angles to the z'-direction. The sleeve (18) is centralized by further springs, and damped by damping elements (27). Located for rotation in radial roller bearings (43) on the sleeve (18) is a further ring (44). The axis of rotation (7) is parallel to the z'-direction. Clamped on the ring (44) is a honing tool (6). With this device, vibrations arising during honing can be effectively damped. The machining of the gear is thereby improved, and the honing tool life prolonged.

6 Claims, 2 Drawing Sheets

DEVICE FOR THE HONING OF GEARS

FIELD AND BACKGROUND OF THE INVENTION

Gear honing is known as an extremely fine machining process which is nowadays employed frequently, and which favourably influences the noise characteristics of gears in gear drive units. Honing is performed with gear-shaped honing tools both with internal and external teeth which on engagement produce machining marks on the workpiece tooth flanks, that are beneficial for the generating action of the gears in mesh. The honing tools engage with the workpiece teeth at a certain crossed axes angle, producing between the honing tool and the workpiece surface a relative motion that is utilized as a cutting action.

With regard to the dynamic stabiliy, however, the honing process poses problems. Vibrations arise which are intrinsic to the process, and thus hardly avoidable. In general the vibrations are only slight. In the case of certain unsuitable constellations of tooth geometry, workpiece dimensions, E-modules of tool and workpiece etc., however, these vibrations can attain inacceptably high amplitudes, which has a negative influence on the surface quality of the workpieces. The honing tools are thereby heavily stressed, which leads to damage to, or even fracture of their teeth. In the event of a destruction of the honing tool, the vibrations also cause overloading of bearings etc., which is detrimental to the life of the machine. It has been shown that by an increase in the stiffness the vibration response of the machine with respect to the problematics described is only negligibly altered; on the contrary: the load peaks on the honing tool during the process lead to a rapid deterioration in the form of the tool tooth flanks, which in turn demands frequent profile re-dressing. From the U.S. Pat. No. 4,354,328, a worm-shaped honing tool is known which is attached to a spindle, firmly fixed against rotation, but axially and radially spring-loaded via O-rings. This honing tool produces more unfavourable machining marks on the gear, because these run largely in the lengthwise direction of the teeth. The device has the disadvantage that the angular position of the honing tool during honing is undefined. If the angular position of the honing tool changes, e.g. due to non-uniform elasticity of the two radially supporting O-rings, this leads to an irregular machining of the tooth flanks over their depth. Depending on the consistence of the O-rings, the pressure of contact varies with the angle of rotation. Moreover the high frequency alternating load on the O-rings leads to a rapid ageing and to elevated temperatures of the O-rings during honing, which alters their elastic properties and the pressure of contact as honing proceeds.

SUMMARY OF THE INVENTION

The present invention is rooted in the objective of introducing a honing device for gear honing, with which the stated disadvantages of known honing processes can be reduced. This task is solved by way of the combined features of the claims.

The basis of the invention is that, in contrast to the conventional processes, the mass components of the honing tool forcibly induced by the process are reduced and furthermore disconnected from the remaining subassembly of the machine, moreover such that an angular deflection of the honing tool relative to the workpiece axis is prevented. Hereby for one thing the forces exerted on the tool and the workpiece are reduced, while on the other hand, in contrast to the known devices, a geometrically correct reproduction of the tool profile without angular error is assured on the workpiece surface. This is achieved by a suitable selection of the type and arrangement of the spring-loading and damping elements and the guides. The disconnection thus attained is located accordingly as near as possible to the source point. Via the damping elements mechanical energy is extracted from the undesirably oscillating system, so that the system is steadied and stabilized.

Because the spring-loading and damping elements are located between non-rotating parts, a constant contact pressure for a given deflection is attained independent of the angle of rotation of the honing tool. The spring elements are only statically loaded, so that e.g. elastomere components with the necessary intrinsic damping characteristic can also be employed as spring-loading and damping elements.

If the device is also used for repeatably re-dressable honing tools, the geometry of the profiling tool must be transferred very accurately to the honing tool. This means that for the dressing operation (profiling) the degree of freedom must be restricted or eliminated at least in the radial direction. For this a switching mechanism is provided, by which the springloading and damping elements can be activated or de-activated selectively.

BRIEF DESCRIPTION OF THE DRAWINGS

In the following an embodiment of the invention is explained with reference to the drawings. These display.

DETAILED DESCRIPTION OF A PREFERRED EMBODIMENT

Figure 1:
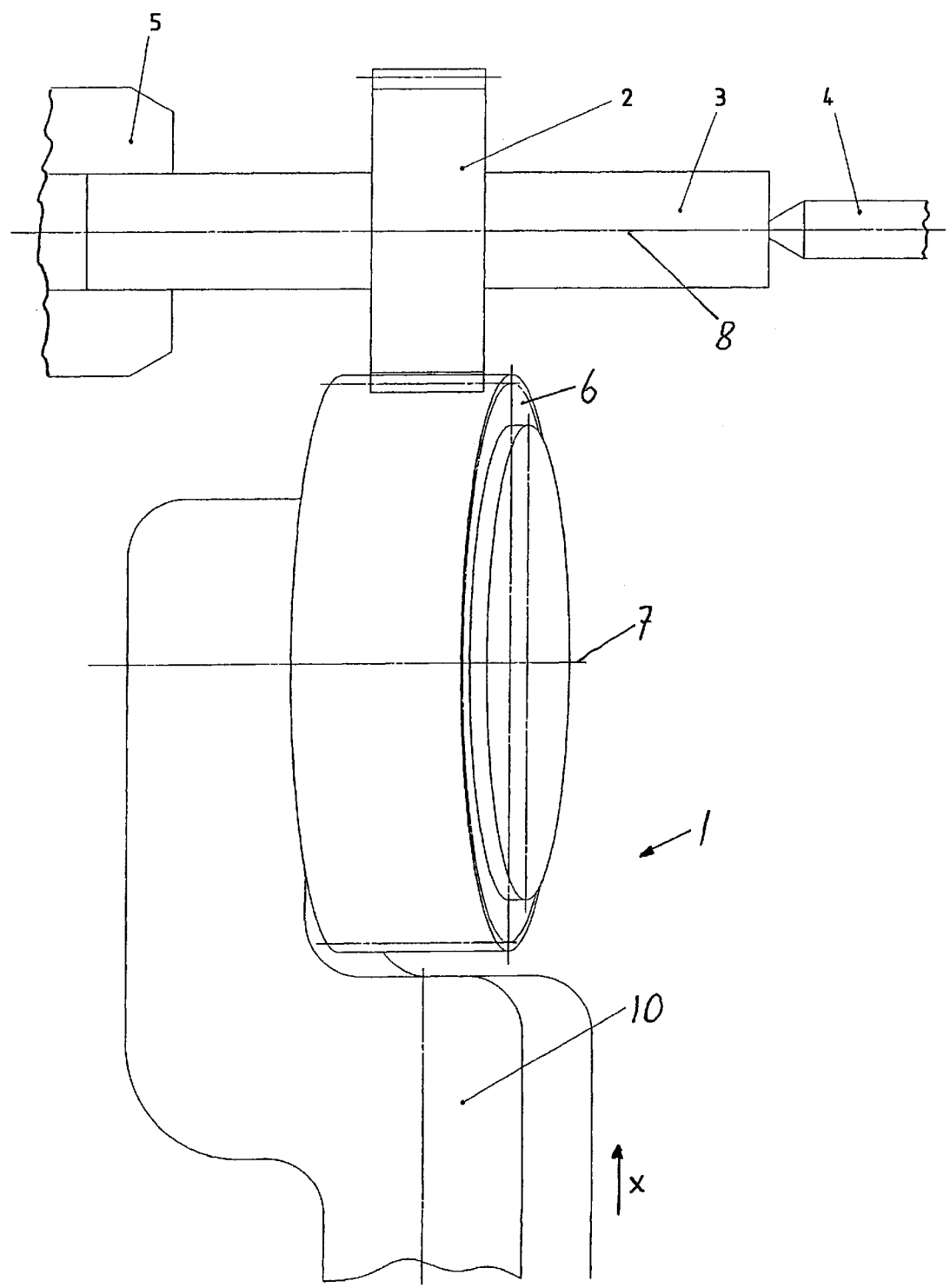
FIG. 1 a plan view.
Figure 2:
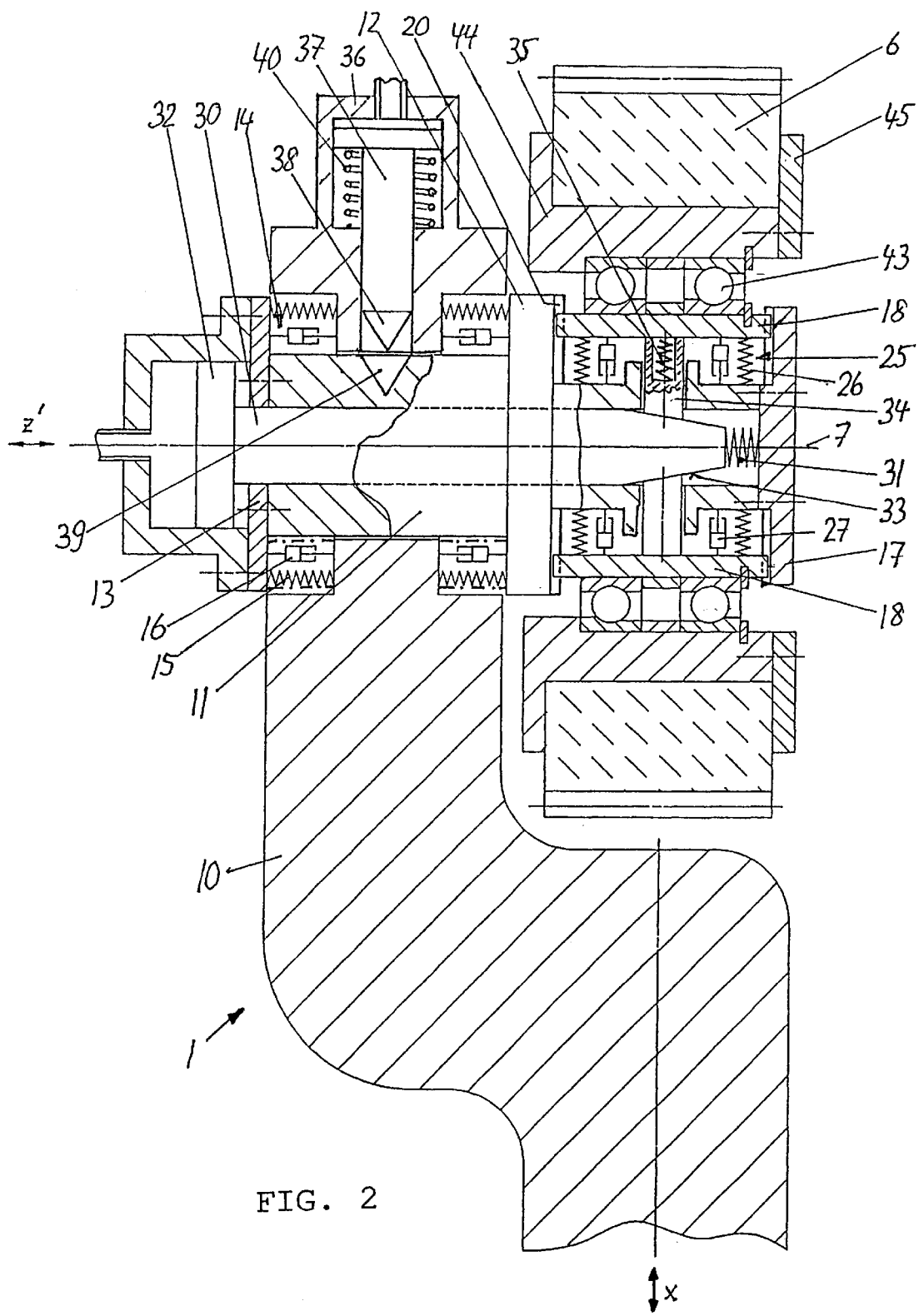
FIG. 2 a cross-section through the honing device.

In the case of the honing device depicted in FIG. 1 and FIG. 2, the honing tool 6, or honing gear wheel, is located in cantilever fashion. This has advantages with respect to accessibility for an efficient tool change. Designs are also conceivable, however, by which the honing tool is supported symmetrically. Differing angles of inclination of the honing tool 6 relative to the workpiece 2 are also conceivable. These can under circumstances contribute to an optimizing of the material removal rate and/or the surface finish. The honing tool is depicted as an externally toothed honing gear. It can, however, also be designed with internal teeth.

The honing tool 6 can be brought into mesh with the teeth of the workpiece 2, which is set up on the mandrel 3, by an infeed action of the honing device 1 in the x-direction. The mandrel 3 is held between the tail centre 4 and the chuck 5, whereby the drive is via the chuck 5. The honing tool 6 rotates freely with the workpiece. By an infeed increment in the x-direction, the honing pressure required for maching is obtained, which leads to material removal from the workpiece surface. The axis of rotation 7 of the honing tool 6 is set skew relative to the axis of rotation 8 of the workpiece 2.

The honing device 1 has a support 10 in which an arbor 11 is located parallel to the axis 7 in the z' direction, longitudinally displaceable but fixed against rotation. The direction z' is at right angles to the infeed direction x. The arbor 11 has a flange 12 and a screwed on counter-flange 13. Fitted between these flanges 12, 13 and the support 10 are spring-loading and damping elements 14, e.g. in the form of pre-stressed metal springs 15 and hydraulic or pneumatic damping members 16. Fitted between the flange 12 and another flange 17 screwed to the arbor 11 is a cylindrical sleeve 18, displaceable in the x-direction. The axis 7 of the sleeve 18 is at right angles to the x-direction. The sleeve 18 is secured against rotation relative to the flanges 12, 17 by rails 20 running in the x-direction, which engage in appropriate slots in the sleeve 18. Fitted between the sleeve 18 and the arbor 11 are further damping elements 25 in the form of springs 26 and damping members 27.

Both the movement of the sleeve 18 and the movement of the arbor 11 are blockable in a specified position. For this purpose a piston rod 30 is fitted displaceably in the z'-direction in the arbor 11, the piston rod being pre-loaded in a basic position by a spring 31. For locking, the piston 32 of the rod 30 is subjected to a pressure medium, such that the rod 30 moves to the depicted locking position in which two taper surfaces 33 converging towards the axis 7 meet counterpart surfaces of thrust pieces 34 fitted displaceably in the x-direction in the arbor 11, thereby pressing their end faces against the inside of the sleeve 18, so that the latter is fixed relative to the arbor 11. With the rod 30 in its basic position, the thrust pieces 34 are pressed against the surfaces 33 by springs 35, such as to release the radial movement of the sleeve 18. The fixing of the arbor 11 relative to the holder 10 is indicated by way of a cylinder 36, the piston rod 37 of which has a conical point which at the locking position engages in an accordingly conical depression 39 in the arbor 11. The piston is returned to the unlocked position depicted by a spring 40.

Located on the sleeve 18 are the inner races of two roller bearings 43, the outer races of which bear a flanged ring 44. Located on this via a clamping flange 45 is the honing tool 6.

Instead of the springs 15, 26 and damping elements 16, 27, other spring-loading and damping elements 14, 25 can also be used; e.g. rings of an elastomere with high intrinsic damping property. This variant is indicated for the lower elements 14 in FIG. 2 by chain-dotted lines.

Instead of the depicted style of blocking in the x-direction, the thrust pieces 34 can also be replaced by a shaft with conical bore coaxial to the axis 7, passing through and fixed at both ends to the sleeve 18, by which in the locked position a conical point of the piston rod 30 engages in this bore. The thrust pieces 34 could also be connected to the rod 30 by toggle links instead of the taper surfaces 33.

Instead of the depicted frictional guides between arbor 11 and holder 10, and between arbor 11 and sleeve 18, these guides can also be fitted with linear roller bearings. This has the advantage of lower friction, so as to permit the damping of vibrations of such low amplitudes that would not suffice to overcome the friction in a friction bearing. Roller bearings usually also permit guidance with less clearance.

What is claimed is:

1. Device for the honing of gears, comprising a first holder (10) capable of infeeding in a first direction (x) towards the gear to be honed, a second holder (11) located in the first holder, a third holder (18) located on the second holder (11) capable of motion parallel to itself in the first direction (x), at least one first spring-loaded and damping element (25) fitted between the third holder (18) and the second holder (11), and on the third holder (18) a rotationally located honing tool (6) an axis (7) of which is at right angles to the first direction (x).

2. Device according to claim 1, in which a position of the third holder (18) is blockable in a given position relative to the second holder (11) by means of at least one locking element (30, 34).

3. Device according to claim 2, in which the locking element (30, 34) comprises a piston (30) displaceable in the second holder (11), which piston either has at least one surface (33) inclined to a axis (7) and to the direction of displacement of the piston (11), on which surface at least one locking member (34) slides, which locks the third holder (18) in the specified position relative to the second holder (11), or in which the piston (30) is connected to the third holder (18) via a blockable toggle link.

4. Device according to claim 1, in which the second holder (11) is displaceably located parallel to the axis (7) in the first holder (10), and at least one second spring-loaded and damping element (14) is fitted between the second holder (11) and the first holder (10).

5. Device according to claim 4, in which the second holder (11) is blockable in a specified position relative to the first holder (10) by means of a second locking element (37).

6. Device according to claim 1, in which the spring-loaded and damping elements (14, 25) are composed of a combination of springs (15, 26) and hydraulic or pneumatic damping elements (16, 27), or of elastomere elements with intrinsic damping properties.

* * * * *